Dec. 11, 1923.  
F. C. LEONARD  
THERMOSTATIC VALVE  
Filed Feb. 10, 1921  
1,476,719  
2 Sheets-Sheet 1

Inventor.
Frederick Charles Leonard,
Per Louis M. Schmidt
Attorney.

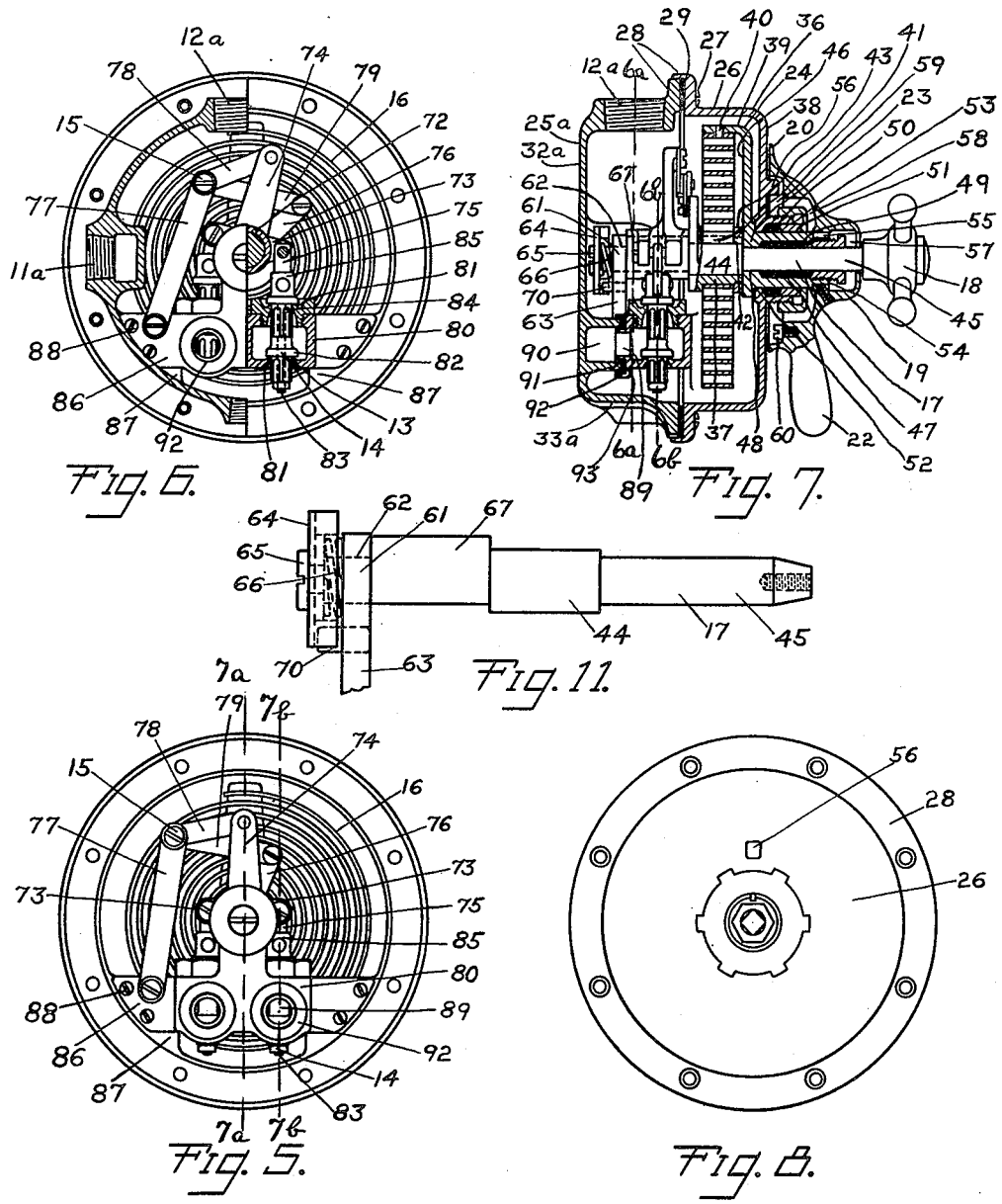
Dec. 11, 1923.
F. C. LEONARD
THERMOSTATIC VALVE
Filed Feb. 10, 1921
1,476,719
2 Sheets-Sheet 2
Inventor.
Frederick Charles Leonard,
Per Louis M. Schmidt
Attorney Patented Dec. 11, 1923.

1,476,719

UNITED STATES PATENT OFFICE.

FREDERICK CHARLES LEONARD, OF PROVIDENCE, RHODE ISLAND, ASSIGNOR TO LEONARD-ROOKE COMPANY, OF PROVIDENCE, RHODE ISLAND, A CORPORATION.

THERMOSTATIC VALVE.

Application filed February 10, 1921. Serial No. 443,796.

*To all whom it may concern:*

Be it known that I, FREDERICK CHARLES LEONARD, a citizen of the United States, residing at Providence, in the county of Providence and State of Rhode Island, have invented certain new and useful Improvements in Thermostatic Valves, of which the following is a specification.

My invention relates to improvements in thermostatic valves, of the form that is known as water mixing valves being supplied with water at two different temperatures and delivery water at a temperature intermediate those of the supplies that is obtained by mingling or mixing the water from the two supplies, the invention being related to that shown and described in the application filed by me March 29, 1919, Serial No. 286,079, and also to that in application Serial No. 568,966, filed June 27, 1910, and the object of my improvement is to produce a valve device that is provided with means for controlling the mixing of the water so that the water will be delivered at a predetermined temperature and means for shutting off the water flow; that has operating devices for the said means that are simple, convenient, and easily manipulated; that is constructed and arranged so that the operating and controlling mechanism is easily separable from such part as receives the piping and connections, whereby access may be had to the said mechanism without disturbing the said piping and connections; that has a relatively compact form of structure; and that, by a change in the details of the part that receives the piping and connections is adapted to be supported in close relation to the face of a side wall, so that the piping will be substantially flush therewith, or the said part can be imbedded in the side wall so as to permit the piping to be concealed.

In the accompanying drawings—

Figure 5 is a rear elevation, on an enlarged scale, of the front part of the housing and the mechanism that is housed therein.

Figure 6 is a view part in rear elevation and part in section, of the parts shown in Fig. 5, the parts in section being on lines $6^a$—$6^a$ and $6^b$—$6^b$ of Fig. 7.

Figure 7 is a sectional view on the lines $7^a$—$7^a$ and $7^b$—$7^b$ of Fig. 5.

Figure 8 is a front elevation with the hand wheel and the temperature control member removed.

Figure 11 is a side elevation of the shaft or rod and the spring and stop mechanism that cooperate therewith.

Figure 1:
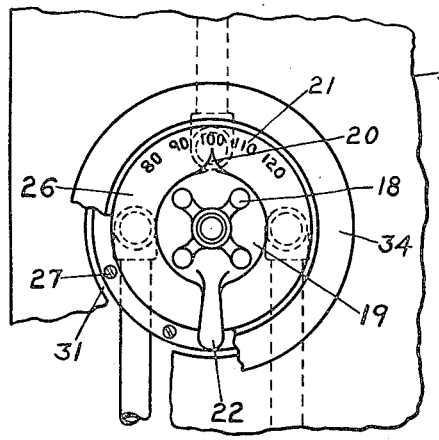
Figure 1 is a front elevation of my improved thermostatic valve mounted on a side wall with the rear end portion imbedded therein, with the piping concealed, and having an escutcheon applied to the valve structure.

My improved thermostatic valve comprises a casing 10 that is provided with a plurality of openings for pipe connections, comprising a pair of inlet openings 11 for being connected to the supply pipes, one for hot water and the other for cold water, and a delivery opening 12 for connection with the delivery pipe.

Adjacent each of the inlet openings 11 there is a valve device, comprising a fixed seat structure 13 and a movable valve structure 14 for cooperating therewith, for controlling the flow of water through the inlet openings 11.

Link mechanism, designated generally by the character 15, serves as the connecting means intermediate the movable valve structures 14 and control devices for regulating the quantity of flow and the temperature of the water that is delivered.

A thermostat 16, supported in part by the shaft 17 and connected to the link mechanism 15, serves as the control device for controlling the temperature.

The control device for adjusting the quantity of flow comprises mechanism that is operated by rotating the shaft 17 by means of a hand wheel 18 that is mounted on the outer end of the shaft 17, the said shaft 17 being extended outwardly through the casing 10.

A temperature setting device 19 is rotatively mounted on the portion of the shaft 17 intermediate the hand wheel 18 and the casing 10, has an index finger 20 that cooperates with a dial 21 on the opposed portion of the casing 10, and also has a radially directed handle 22.

The temperature setting device 19 operates upon the thermostat 16 through the medium of a connecting device 23 that projects through the casing 10, is rotatively mounted on the shaft 17, has the outer end portion operatively connected to the said temperature setting device 19, and has within the interior of the casing 10 a radially directed arm 24 that is connected to the thermostat 16.

Stuffing-boxes are provided for the connecting device 23, comprising the inner stuffing-box 49 between the same and the shaft 17 and the outer stuffing-box 50 on the outer side, opposed to the casing 10.

The casing 10 is composed of two main parts, comprising the base or fixed part 25 and the cover or removable part 26, the said parts being secured together by means of screws 27 that engage with overlapping flanges 28 that are provided on the said parts 25 and 26, a suitable packing ring 29 being interposed between the said flanges.

The devices mentioned above and the functions thereof, so far as pertains to the general significance of the terms employed, are not of themselves novel.

I have, however, devised details of construction and arrangement of the parts to provide for special situations and conditions that are embodied in the present improved form of structure.

These will now be considered.

The device is adapted to be supported from a side wall, and, as distinguished from such devices in common use, and which are positioned in off-set relation to the said wall, it is positioned so as to be in close relation to the wall, as in the two forms that are shown.

Figure 2:
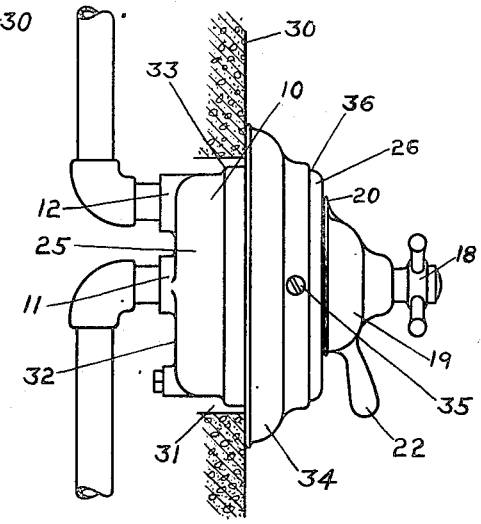
Figure 2 is a side elevation of the valve structure and the piping shown in Fig. 1, the front portion of the side wall being shown in section.
Figure 3:
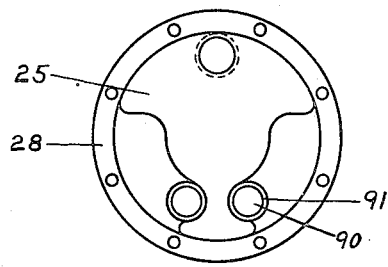
Figure 3 is a front elevation of the rear or base portion of the casing.

Thus in the form shown in Figs. 1 and 2 the base 25, which constitutes the rear end portion of the casing 10, is imbedded in the side wall 30, being positioned in an opening 31 in the said side wall 30. In this form the pipes that connect with the openings 11 and 12 are concealed, and, because of the shallowness of the base structure, in order to provide for convenience in making the connections and doing the pipe-work, I provide the said openings 11 and 12 in the back wall 32 of the said base 25.

Figure 4:
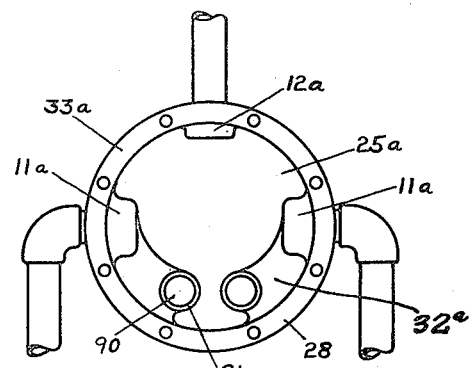
Figure 4 is a similar view of a modified form of said rear or base portion, with the piping connected thereto, being adapted to be positioned against the face of a supporting wall.
Figure 9:
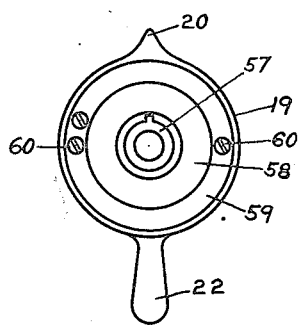
Figure 9 is a rear elevation of the temperature control member.
Figure 10:
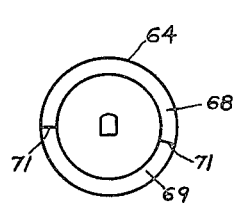
Figure 10 is an elevational view, as viewed from the inner face, and on an enlarged scale, of the stop washer that serves to limit the rotative movement of the shaft.

In the form shown in Fig. 4 the base 25$^a$ is set against the side face of the side wall, with the back wall 32$^a$ generally in abutment therewith. In this form the said back wall 32$^a$ is unbroken and the pipe openings 11$^a$ and 12$^a$ are provided in the form of radially directed openings in the side wall 33$^a$ of the base 25$^a$.

It will be noted that the depth of the base 25$^a$ is determined by the size of the opening 12$^a$ for the delivery pipe, the flange 28 on the front side thereof and the back wall 32$^a$ on the rear side thereof being separated therefrom only by such space as is required under practical conditions for providing clearance for the pipe.

The said delivery opening 12$^a$ is larger than the inlet openings 11$^a$, the former being adapted to receive standard $\frac{3}{4}$ inch pipe and the latter $\frac{1}{2}$ inch pipe in the structure being described, which is adapted to deliver nine gallons of tempered water per minute.

In the case of installations having concealed piping the housing opening 31 in the side wall 30, in order to provide for leeway for the piping, is made larger than would be strictly necessary to provide clearance for the side wall 33 and may in some cases be made larger in diameter than the flanges 28 so as to leave a part of the housing opening exposed around the valve structure. In order to conceal such an exposed part of the opening I provide an escutcheon 34, having a set-screw 35, that is adapted to slip over and be supported by the cylindrical shell-like side wall 36 of the cover part 26 and that is of sufficient radial extent to extend over the flanges 28 and the adjacent part of the opening 31.

The escutcheon 34 thus serves also to conceal the holding screws 27 that hold the casing parts together.

Thus, as described, the base 25 is relatively shallow and, in order to provide for housing the mechanism therein a special form has been devised for the said mechanism, and the parts are disposed within the casing in a novel manner, as will be described below.

In the case of the cover part 26, this is also made of minimum depth and the only part substantially that is housed therein is the thermostat structure, composed of the thermostat proper 16 and the supporting devices therefor.

The said thermostat 16 is in the form of a spiral coil of sheet material and is supported at the outer end by the radial arm 24 and at the inner end by the sleeve 37 that is rotatively mounted on the shaft 17. The said arm 24 has the body portion positioned between the thermostat 16 and the front wall 38 of the casing cover part 26 and has a rearwardly directed branch 39 that is secured to the thermostat 16 in any proper manner, as by means of a rivet 40.

The inner end 41 of the thermostat 16 is entered into a slot 42 in the sleeve 37 and is held in place by means of an annular nut 43 that is engaged with the front end of the said sleeve 37. The nut 43 is housed in the space between the thermostat 16 and the connecting device 23 that is mounted on the shaft 17, said nut 43 and the front end face of the sleeve being opposed to the rear face 46 of the body portion 51 of said connecting device 23.

The sleeve 37 is mounted on a part 44 of the shaft 17 that is enlarged relatively to front part 45 and the shoulder at the junction of these parts abuts against said rear face 46 of the body portion 51 of the connecting device 23 as a bearing for the shaft 17, operating as a thrust bearing.

The side wall of the opening 47 in the connecting device 23 has a part 48 at the inner side of the stuffing-box 49 that fits the stem part 45 of the shaft 17 and which serves as a positive bearing for the front end portion of the said shaft 17.

The exterior of the connecting part 23, adjacent the junction of the arm 24 and the body portion 51, is finished off suitably to cooperate as a bearing with the opposed corner 52 at the inner end of the opening 53 that is provided in the casing 10 for the said body portion 51.

The temperature setting device 19 is non-rotatively mounted on a reduced extension 54 at the front end of the body portion 51 of the connecting device 23, as by means of a key 55, and is positioned longitudinally at the front end by the hand wheel 18, which is opposed to the front face thereof, and at the rear by the opposed front wall 38 of the casing cover part 26.

On the front face of the casing cover part 26 is provided a stop 56 in the form of a projection for limiting the rotative movement of the temperature setting device 19, being in spaced relation outwardly, radially, from the outer stuffing box structure 50.

Thus between the reduced extension 54 to which the temperature setting device 19 is connected and the opposed front face of the casing cover part 26 there is the stop 56 mentioned and also the outer stuffing-box structure 50, and at the front of said reduced extension 54 are certain parts of the inner stuffing-box 49, and these parts might in some cases be exposed. I prefer, however, to extend the structure of the temperature setting device 19 and provide suitable chambers therein so as to enclose and cover these otherwise exposed parts.

Thus there are provided the front chamber 57 for the inner stuffing-box 49, the intermediate chamber 58 for the outer stuffing-box 50, and the rear chamber 59 for the stop 56.

For cooperating with the stop 56 the opposed face of the wall of the chamber 59 is provided with stops 60 in registration with the said stop 56.

The rear end portion 61 of the shaft 17 projects through a bearing 62 in a transversely directed arm 63, is provided at the extreme end with a washer 64 that is held in place by an axially positioned screw 65, and interposed between the said washer 64 and the arm 63, and mounted on the said rear end portion 61 is a spring 66 that tends to draw the shaft 17 towards the rear.

Such inward movement of the shaft 17 is limited by means of an enlargement 67 of the shaft 17, which is in the form of an eccentric for a purpose to be described, and which engages with the opposed front face of the arm 63.

Suitable stop devices are provided for limiting the rotative movement of the shaft 17 and one way of doing this, as shown, involves the use of the washer 64, which in such case is secured non-rotatively on the said shaft 17, and also, is made of sufficient diameter to provide an outer part 68 that overhangs the spring 66 and has a recess or cut-away part 69. A fixed stop 70 projects rearwardly from the arm 63 over the length of the spring 66 and is housed in the recess 69 so that the end walls 71 of the said recess will be in resigtration with the said fixed stop 70.

Thus the end walls 71 are adapted to abut against the fixed stop 70 and thereby limit the rotative movement of the shaft 17 and these stops are so disposed as to permit of a full opening of the valve to the extent desired and to permit of completely closing the valve and stopping all flow therethrough. Such closing of the valve involves the seating of both of the movable valve structures 14 against the two fixed seat structures 13. Actually I prefer to adjust the parts so that the valve structures will be brought to the seated position before the particular stop 71 that is adapted to limit the rotative movement of the shaft in the direction for closing the valve is permitted to contact with the fixed stop 70, whereby the rotation of the shaft 17 in the direction for closing is limited by means of the valve devices and the connected parts.

The eccentric enlargement 67 of the shaft 17 extends from the arm 63, against which it abuts as mentioned, to the cylindrical enlargement 44 on which the sleeve 37 is mounted, and serves as the bearing for the hub portion of the rocking member 72 that is connected to the link mechanism 15 and also to each of the movable valve structures 14.

The means for effecting the connections mentioned comprise a set of arms arranged generally in the form of the letter T, consisting of two relatively short and oppositely directed arms 73 and the longer arm 74 extending at right angles to said short arms 73 from a common junction therewith.

Short links 75 serve to connect the short arms 73 with the adjacent movable valve structure 14.

The link mechanism 15 serves to interconnect the arm 74 with the sleeve 37, the connection with the latter being made through the medium of the radial arm 76 provided thereon and which is positioned adjacent the rear face of the thermostat 16.

The link mechanism 15 comprises a swinging post 77 that has one end operatively supported by means of a pivot that has a fixed position and has the other end connected by a pair of links to the arms 74 and 76. Thus the link 78 connects with the arm 74 and the link 79 with the arm 76.

As described the rocking member 72 will be rotated responsive to changes in the length of the thermostat 16, such as are effected by a change in temperature of the water to which the thermostat is exposed, and will also be shifted bodily responsive to rotation of the shaft 17 by reason of the eccentric form of the part 67 of the shaft 17 on which it is mounted, and such movements of the said rocking member 72 serve to effect corresponding movements of the moving valve structures 14 to which it is connected.

For the valve devices I prefer to use some form of balanced valve. Thus, as shown, there is in each of the valve devices a pair of valve seats 81 in spaced relation, provided in a suitable housing 80, that serves as the fixed valve seat structure 13, and a pair of valves proper 82 for cooperating with the seats 81. The said valves 82 are supported by a valve stem structure 83 that extends through the openings in the valve seats 81, has suitable longitudinal grooves 84 that serve as passageways for water, and is provided on one end with a head 85 that is connected with the link 75.

The valve housings 80 and the arm 63 that supports the bearing 62 for the shaft 17 are parts of a unitary structure 86 that extends in the form of a bridge across the interior of the casing 10 and is supported by its ends on lugs 87 that are provided on the front part 26 of the said casing 10, said bridge being held in place by screws 88.

The valve housings or valve chambers 80 have each an opening 89 in the rear face that connects with the passage 90 that is provided in the base or fixed part 25 and in order to permit separation of the parts the said rear face and the walls of the passage are operatively connected by means of opposed annular portions 91 that are adapted to seat one against the other to provide a separable joint or connection.

One of the said annular portions 91, as shown, may be provided with a groove 92 in which is housed a suitable packing ring 93.

The passage 90 connects in each case in a proper manner with the corresponding inlet or supply opening 11 or 11ª, as the case may be.

Thus, as described, the moving parts are all carried by the cover structure 26 and are removable therewith from the base or fixed part, which condition permits of access to the moving parts without disturbing the piping for the purpose of cleaning or packing the valves, or making changes in any manner desired.

It will be noted that the valve devices 13 and 14 are disposed so that the movable valve structures 14 are operated in a plane that is radially disposed relatively to the axis of the shaft 17 and that this condition permits of the use of the eccentric portion 67 of the shaft for moving the said valve parts 14 towards and away from the fixed seat structures 13 through the medium of the rocking member 72.

The arrangement mentioned also serves to permit of making the entire structure relatively short and compact as regards the axial direction of the shaft.

The utilization of the eccentric feature of the shaft in the manner described operates to effect the opening and closing without involving a longitudinal or axial movement of the shaft. That is to say, in turning the shaft by means of the handle provided therefor for opening and closing the valves there is no longitudinal movement of the shaft relatively to the casing.

I claim as my invention:—

1. In combination in a thermostatic valve, a casing, a shaft supported axially in said casing, a pair of valves operatively supported from said shaft, a thermostat connected to said valves, said valves operating in a common plane, and said plane being at right angles to the axis of said shaft.

2. In combination in a thermostatic valve, a casing having a pair of inlet passages, a reciprocating valve for each of said passages, a thermostat of coil form housed within said casing, a shaft, a rocking member supported from said shaft and having a pair of similar and oppositely directed short arms and an intermediate radially directed arm, a short link connecting individually each of said short arms with a valve, and link mechanism serving as the means for operatively connecting said thermostat with said radially directed arm of the rocking member.

3. In combination in a thermostatic valve, a casing, a shaft supported by said casing, a rocking member operatively supported by said shaft, a pair of valves supported by said rocking member, a thermostat housed within said casing and connected with said rocking member, said rocking member having a hub portion that is mounted on a portion of said shaft, and said portion of the shaft being of eccentric form.

4. In combination in a thermostatic valve, a casing, a shaft supported by said casing, a rocking member having a hub portion that is mounted on said shaft, a pair of valves supported by said rocking member, a sleeve mounted on said shaft, a thermostat housed within said casing and connected with said sleeve, a swinging post pivotally supported at one end from said casing, and the other end of said post being connected by means of one link with said sleeve and by means of another link with said hub portion.

5. In a thermostatic valve, a casing having a front wall that is provided with an opening, a shaft extending from the interior of said casing forwardly through said opening and positioned axially therein, a sleeve-like connecting piece mounted on said shaft and extending through said opening, a thermostat housed within said casing and connected with the inner end of said connecting piece, an adjusting handle for said thermostat positioned in front of said front wall and mounted on the outer end of said connecting piece, and said adjusting handle having a body portion that is of extended, shell-like form that serves to enclose and cover the adjacent portions of said connecting piece.

6. In a thermostatic valve, a casing, a shaft supported for rotation by said casing and axially positioned therein, a rocking member operatively supported by said shaft, a pair of valves supported by said rocking member, a thermostat housed within said casing and connected with said rocking member, and means housed within said casing for limiting rotation of said shaft, said means serving to limit the rotation of the shaft to less than a complete revolution.

7. In combination in a thermostatic valve, a casing, a shaft supported by said casing, a rocking member operatively supported by said shaft, a pair of valves supported by said rocking member, and a thermostat, said thermostat being supported at one end by said casing and at the other end by said shaft, and link mechanism serving to operatively connect said thermostat and rocking member.

8. In combination in a thermostatic valve, a casing, a shaft supported by said casing, a rocking member operatively supported by said shaft, a pair of valves supported by said rocking member, and a thermostat connected with said rocking member, and supported from said shaft at one of its ends, and means for supporting the other end of said thermostat, said means comprising an arm that is directed radially relatively to said shaft and is supported from said casing for rotation concentric with said shaft.

9. In combination in a thermostatic valve, a casing having a pair of inlets, a reciprocating valve for each of said inlets, a separate and individual stem for each of said valves, a shaft supported from said casing and positioned axially therein, a rocking member provided with a pair of arms that are individually connected to said valves, and said rocking member being mounted for rotation upon said shaft.

10. In a thermostatic valve, a casing having separate inlets for hot and cold water, a valve for each of said inlets, a thermostat for controlling the setting of said valves, and said thermostat comprising a single coil of spiral form having a plurality of convolutions, an adjustable supporting arm being connected to one end of said coil, and a sleeve supported for free rotation on said shaft connected to the other end of said coil.

11. A thermostatic valve comprising a casing, a shaft extended through the wall of said casing, a thermostat of coil form housed within said casing, means for supporting one end of said thermostat from said wall and having limited rotative movement concentric with said shaft, and a sleeve-device mounted for free rotation on said shaft operatively connected with the other end of said thermostat.

12. A thermostatic valve comprising a casing, mechanism housed in said casing comprising a shaft, a thermostat, and valve devices, said casing being composed of a base part and a cover part, and said mechanism being operatively supported entirely by said cover part.

13. A thermostatic valve comprising a casing, mechanism operatively supported by said casing comprising a shaft, a thermostat, and valve devices, said casing being composed of a base part at the rear and a cover part in front of said base part, said cover part being in the form of a shell-like structure that is open at the rear end portion and has a front wall at the front end, said front wall having an opening through which said shaft extends, and a bridge extending across said rear end portion of the cover part for operatively supporting the adjacent portion of said shaft.

14. In combination in a thermostatic valve, a casing, said casing having a pair of inlets, a shaft supported by said casing, a rocking member supported by said shaft, a pair of valves for controlling the flow through said inlets supported by said rocking member, a thermostat housed within said casing and connected with said rocking member, said inlets having seats for cooperating with said valves, and means for limiting the rotative movement of said shaft to less than a complete revolution.

FREDERICK CHARLES LEONARD.